(12) United States Patent
Zecchi et al.

(10) Patent No.: US 7,789,105 B2
(45) Date of Patent: Sep. 7, 2010

(54) GAS PRESSURE REGULATOR

(75) Inventors: Stefano Zecchi, Bologna (IT); Andrea Monti, Funo de Argelatio (IT)

(73) Assignee: O.M.T. Officina Meccanica Tartarini S.r.l., Castel Maggiore (Bologna) (IT)

( * ) Notice: Subject to any disclaimer, the term of this patent is extended or adjusted under 35 U.S.C. 154(b) by 643 days.

(21) Appl. No.: 11/753,274

(22) Filed: May 24, 2007

(65) Prior Publication Data
US 2007/0272316 A1  Nov. 29, 2007

(30) Foreign Application Priority Data
Mar. 10, 2007  (IT)  .................. BO 2006 A 000400

(51) Int. Cl.
*F16K 47/02*  (2006.01)
(52) U.S. Cl. ............................. 137/625.33; 137/625.39; 251/127
(58) Field of Classification Search ............ 137/625.33, 137/625.34, 625.35, 625.36, 625.37, 625.38, 137/625.39, 42, 44; 251/127
See application file for complete search history.

(56) References Cited

U.S. PATENT DOCUMENTS

| 2,658,715 | A |   | 11/1953 | Kistner |           |
|-----------|---|---|---------|---------|-----------|
| 4,004,613 | A | * | 1/1977  | Purton et al. | 137/625.3 |
| 4,041,982 | A | * | 8/1977  | Lindner | 137/625.3 |
| 4,221,037 | A | * | 9/1980  | Seger   | 138/42    |
| 4,258,750 | A | * | 3/1981  | Schnall et al. | 137/625.3 |
| 4,335,744 | A |   | 6/1982  | Bey et al. |         |
| 4,617,963 | A | * | 10/1986 | Stares  | 137/625.3 |
| 4,671,321 | A | * | 6/1987  | Paetzel et al. | 137/625.3 |
| 4,705,071 | A | * | 11/1987 | Connors et al. | 137/625.3 |
| 5,327,941 | A | * | 7/1994  | Bitsakis et al. | 138/42 |
| 5,357,793 | A | * | 10/1994 | Jouwsma | 138/42    |
| 2006/0219966 | A1 | | 10/2006 | Zecchi et al. |    |

FOREIGN PATENT DOCUMENTS

| EP | 0 167 252 | 1/1986 |
| GB | 2 277 792 | 11/1994 |
| WO | WO 2006/100603 | 9/2006 |

OTHER PUBLICATIONS

International Search Report for International Application No. PCT/IB2007/001354, dated Oct. 16, 2007.
Written Opinion for International Application No. PCT/IB2007/001354, dated Oct. 16, 2007.

* cited by examiner

*Primary Examiner*—John Fox
(74) *Attorney, Agent, or Firm*—Marshall, Gerstein & Borun LLP

(57) ABSTRACT

The gas pressure regulator (1) comprises a main body (2) having a first, gas inlet pipe (4) and a second, gas outlet pipe (6), a calibrated gas passage (8) through which the gas flows from the first pipe (4) to the second pipe (6), a shutter (9) housed at least partially in the main body (2) and a silencing element (102) also housed in the body (2).

12 Claims, 4 Drawing Sheets

GAS PRESSURE REGULATOR

RELATED APPLICATIONS

This application claims priority to Italian application number BO2006 A0004000 dated May 24, 2006.

TECHNICAL FIELD

This invention relates to a gas pressure regulator.

In particular, the invention relates to a pressure regulator fitted with a noise reducing device.

Pressure regulators currently used are also commonly known as "pressure reducers" because their regulating action is achieved by reducing the gas delivery pressure through laminar flow elements.

Regulators known in prior art basically comprise a main body with an inlet through which gas flows in at high pressure and an outlet through which the gas flows out at reduced pressure. This main body houses means for controlling and regulating the gas flow.

The controlling and regulating means comprise at least one shutter, actuated by spring and diaphragm systems which enable the shutter to slide on its shaft, and a pilot device which measures the pressure of the gas upstream and downstream of the regulator and diaphragm accordingly.

The shutter, usually cylindrical in shape, can move axially between two limit positions: a first gas shutoff position where it is substantially in contact with a respective housing and a second fully open position corresponding to the maximum size of the gas flow port.

The gas flow is shut off by means of a ring seal or pad, normally fixed to the mobile shutter and adapted to engage the housing. The gas laminar flow effect is therefore concentrated at the housing.

This creates a great deal of noise when the reducer is operating under steady-state conditions.

The noise is caused by the physical processes that occur during pressure reduction: the gas flows out of the choked section defined by the diaphragm at a high speed which, under "hypercritical" pressure drop conditions, may even reach the speed of sound; thus, the speed of the gas flowing out of the choked section differs considerably from the speed of the gas in the pipe downstream, this difference creating gas bubbles of varying size (known in the jargon of the trade as "turbulence bubbles") which are expelled continuously by the gas flow itself. The pressure oscillations caused by this process produce noise. The higher the flow speed is, the more the noise. The noise caused by this effect is transmitted to the pipe downstream which in turn becomes a source of noise.

Furthermore, during the "hypercritical" pressure drop, the change from inflow pressure to outflow pressure occurs in non-stationary stages (called "shock waves") which cause rising surges of noise. These waves also cause mechanical vibrations which produce yet more noise.

In recent years, manufacturers of pressure regulators have concentrated their research on silencing devices with a view to reducing regulator noise emissions.

To date, two types of silencing devices are used: silencers that act on the source of the noise and those that reduce the noise actually generated.

Those of the former type include both flow dividing devices and devices that separate the total pressure stage into a plurality of lower pressure stages.

Those of the latter type, which reduce the noise generated, act by absorption and are located downstream of the gas lamination area. These devices usually comprise cartridges made of porous material designed to absorb the sound waves.

Of all the above mentioned devices, the sound absorption devices are the most complex and cumbersome since the cartridges have to be placed inside the pressure regulator bodies. The regulator body therefore has to be larger to accommodate the cartridge which in turn means heavier regulators and higher costs.

The devices that operate by separating the pressure stage are also very complex, even at the design stage, involving considerable complications in the very structure of the regulator.

Of the above mentioned devices, flow dividers are without doubt the most practical and economical since they basically comprise a surface through which the gas passes and which breaks the gas flow up into a plurality of smaller flows, which, as demonstrated in numerous experiments, considerably reduces the amount of noise produced. These devices, however, are not entirely free of disadvantages.

The main disadvantage is that they cannot be installed unless the pressure regulator is totally disassembled. That means that once a certain type of silencing device has been installed, it cannot be substituted without completely disassembling the regulator. In many cases, however, the silencing device in a regulator that has already been installed has to be replaced because it exceeds permitted noise levels or because it has to be adapted to different flow conditions.

The silencing device may also need to be substituted when worn.

In these situations, changing the silencing devices in prior art pressure regulators involves considerable assembly difficulties.

SUMMARY OF THE INVENTION

The aim of this invention is to provide a pressure regulator that overcomes the above mentioned disadvantages and that is simple and inexpensive to assemble and practical to maintain.

The technical characteristics of the invention according to the aforementioned aims may be easily inferred from the contents of the appended claims, especially claim 1, and also any of the claims that depend, either directly or indirectly, on claim 1.

BRIEF DESCRIPTION OF THE DRAWINGS

Moreover, the advantages of the invention are apparent from the detailed description which follows, with reference to the accompanying drawings which illustrate a preferred embodiment of the invention provided merely by way of example without restricting the scope of the inventive concept, and in which.

DESCRIPTION OF THE PREFERRED EMBODIMENTS

Figure 1:
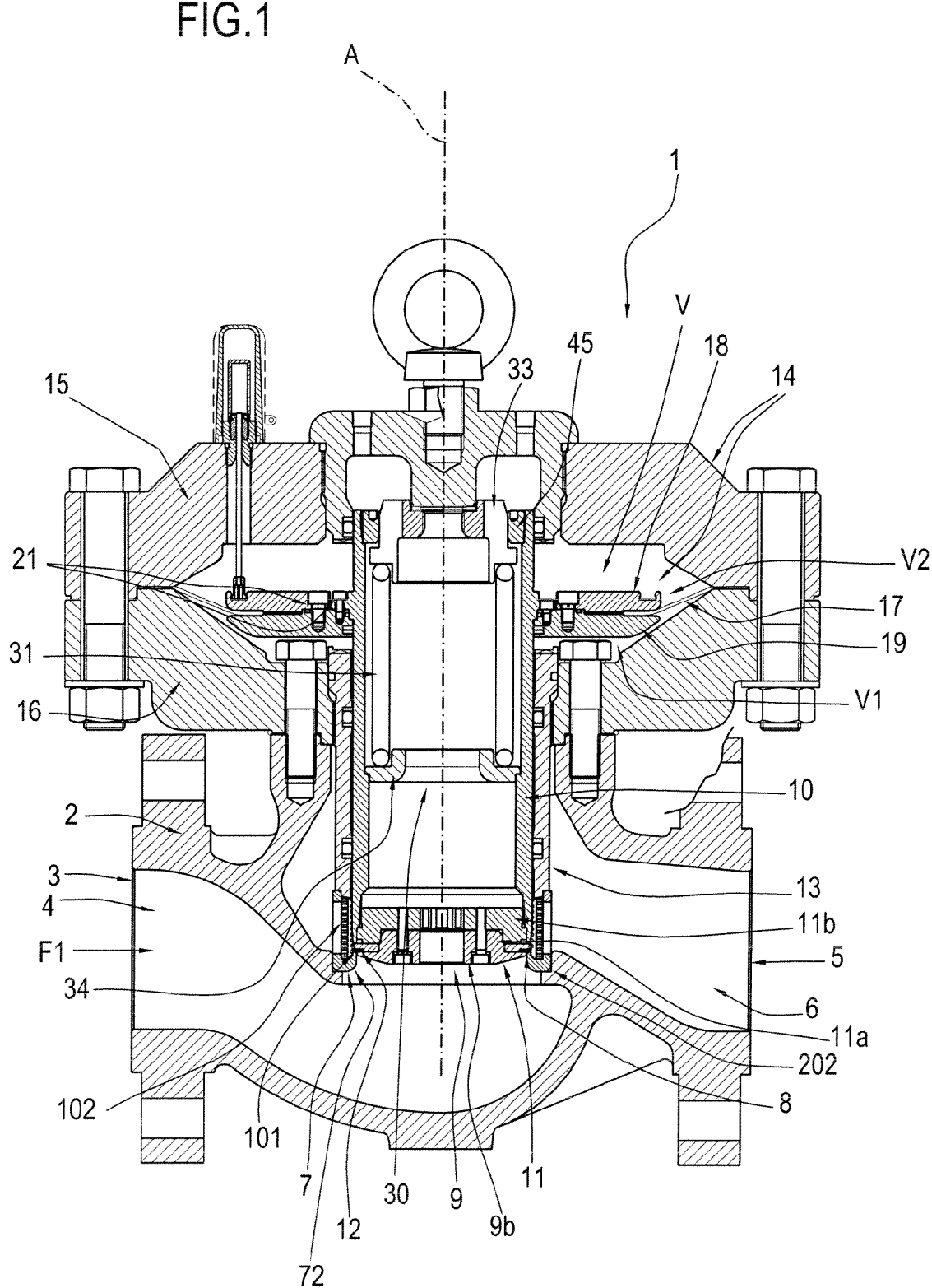
FIG. 1 illustrates a preferred embodiment of the pressure regulator according to the invention in a schematic cross section.

With reference to FIG. 1, the numeral 1 denotes in its entirety a gas pressure regulator made in accordance with this invention.

The pressure regulator 1 comprises a main body 2 with an inlet opening 3 through which the gas enters at a first delivery pressure, said inlet opening 3 being connected to a respective first inlet pipe 4, and a gas outlet opening 5 connected to a respective second outlet pipe 6 in which the gas flows at a pressure that is different from the delivery pressure.

The second outlet pipe 6 is located downstream of the first inlet pipe 4 relative to the direction, indicated by the arrow F1, in which the gas flows through the regulator 1.

Between the first pipe 4 and the second pipe 6 there is an axially symmetric body 7, which will be described in detail below, said body 7 defining a calibrated gas passage 8.

The regulator 1 also comprises, inside it, a shutter 9 that moves lengthways along a first defined line D to adjust the opening of the calibrated passage 8 between a first end position, illustrated in FIG. 1, in which the passage is closed, and a fully open position which is not illustrated in the accompanying drawings.

The shutter 9 comprises a hollow cylindrical body 10 having a central axis A and, at its lower end 9a, an element 11 for shutting off the calibrated passage 8.

The shut-off element 11 comprises two blocks 11a, 11b attached to the cylindrical body 10, the two blocks 11a, 11b having, tightened between them, a seal pad 12 designed to engage a respective locating groove 101 in order to close the gas passage 8. As shown in 2, the groove 101 is ring-shaped and is formed integrally in the axially symmetric body 7.

The calibrated gas passage 8 is shown in FIG. 1 in a substantially closed condition and, in use, is defined by the gap created between the seal pad 12 and the respective locating groove 101 when the shutter 9 moves.

With reference to FIG. 1, the main body 2 has fitted over it a device 14 for actuating the shutter 9, the device 14 comprising a first, upper concave cover 15 and a second, lower, concave cover 16, coupled in such a way that their concavities face each other to delimit a volume V.

The volume V houses an annular diaphragm 17 whose outer edge is held tight between the two covers 15, 16, the diaphragm 17 dividing the volume V into two chambers V1, V2 whose volumetric size varies as a function of the operating parameters of the pressure regulator 1.

The actuating device 14 also comprises two flanges 18 and 19, respectively upper and lower, which hold tight between them an inside edge of the annular diaphragm 17.

The regulator 1 also comprises a cylindrical liner 13 that slidably houses the shutter 9, the liner 13 being stably attached to the lower concave cover 16.

Figure 5:
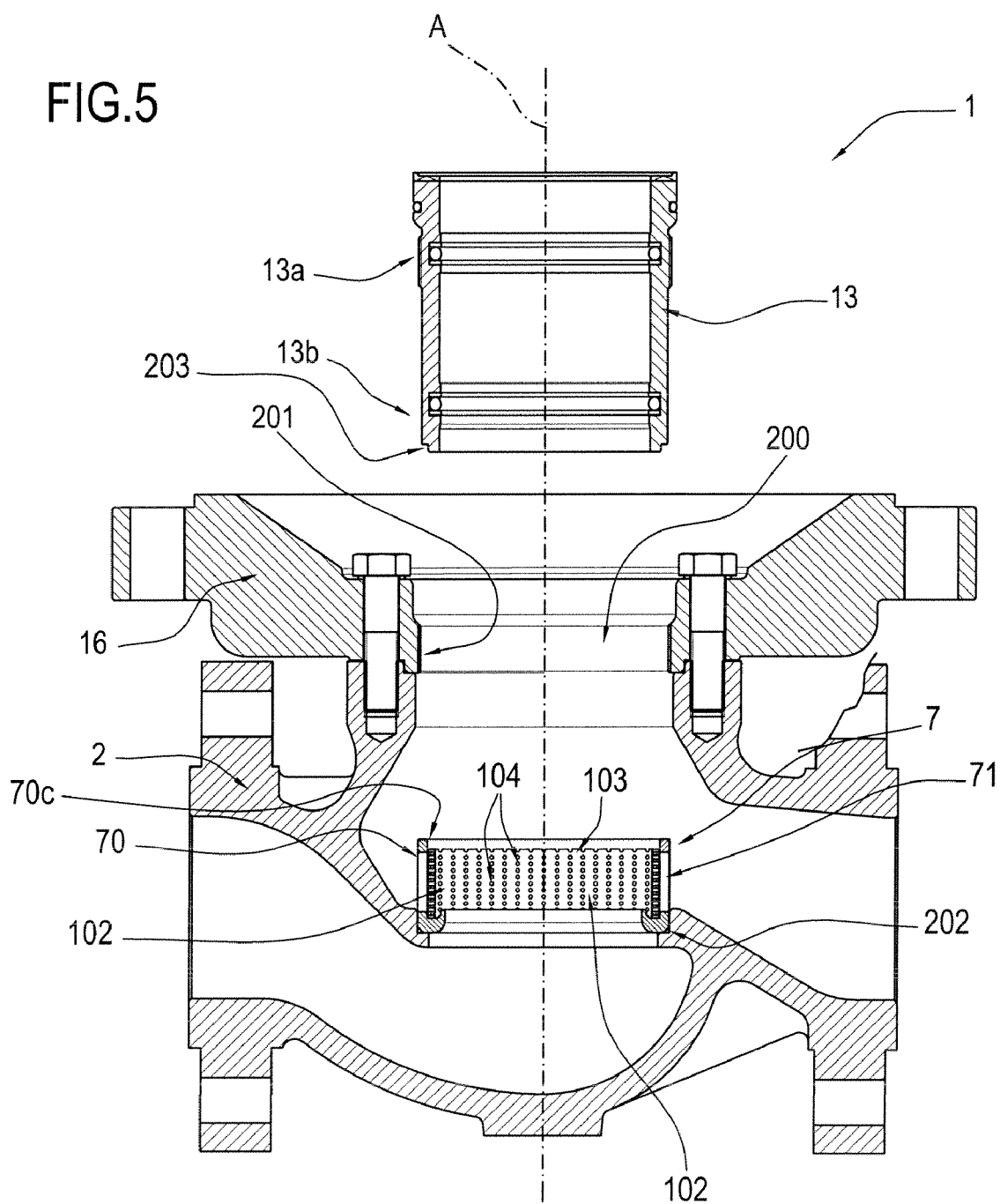
FIG. 5 is a schematic view in cross section, of the pressure regulator of FIG. 1 during the assembly/disassembly steps shown in FIGS. 2 to 4.

Looking in more detail, as clearly shown in FIG. 5, the lower cover 16 has a central circular opening 200 whose inside surface has a threaded portion 201.

Similarly, a portion 13a of the outside surface of the cylindrical liner 13 is threaded so that it can be screwed to the threaded portion 201 of the cover 16.

Thus, the liner 13 can be inserted into, and extracted from, the main body 2 without having to remove the lower cover 16 from its housing.

The two flanges 18, 19 are securely joined to each other and connected to the shutter 9 by a plurality of fastening elements 21.

The cylindrical body 10 of the shutter 9 houses a regulator spring unit 30 comprising a helical spring 31 acting by compression along is axis A, and a first and a second regulator plate 33, 34, respectively upper and lower, positioned in contact with respective opposite ends of the spring 31.

The lower regulator plate 34 abuts against a circumferential ledge made inside the hollow cylindrical body 10.

A ring nut 45 is screwed to a respective threaded inside portion at the top end 9b of the shutter 9.

The regulator 1 also comprises a silencing element 102 of the flow dividing type housed in the axially symmetric body 7.

Figure 2:
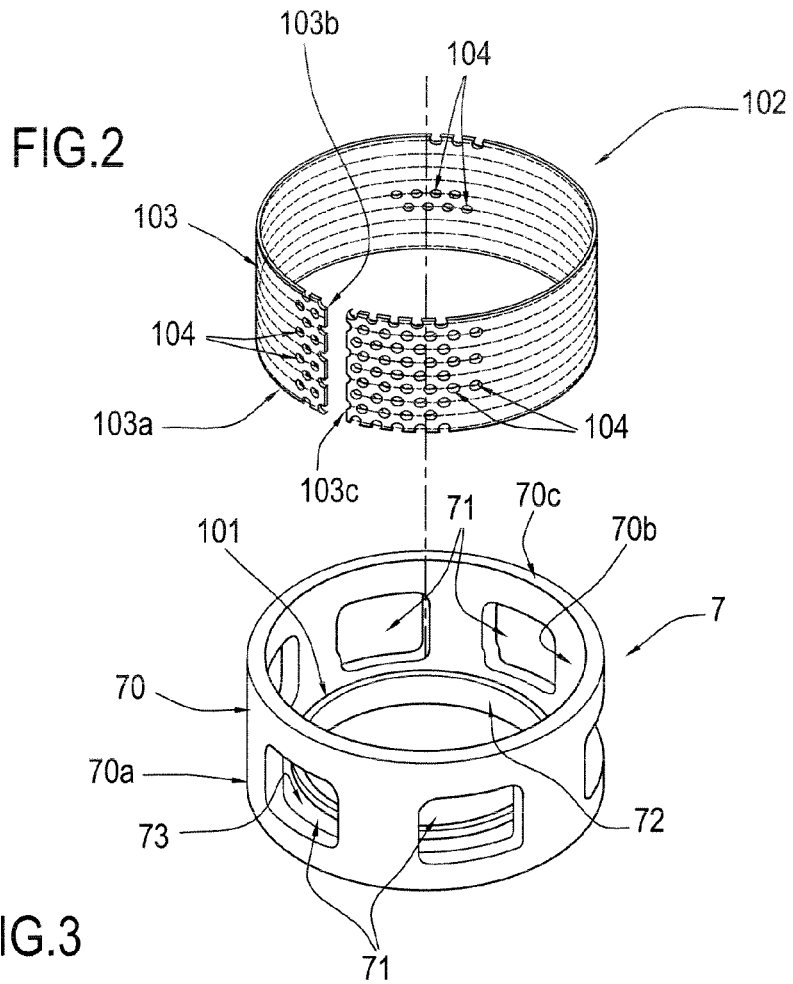
FIG. 2 is a perspective view from above of two disassembled parts of the pressure regulator of FIG. 1.
Figure 3:
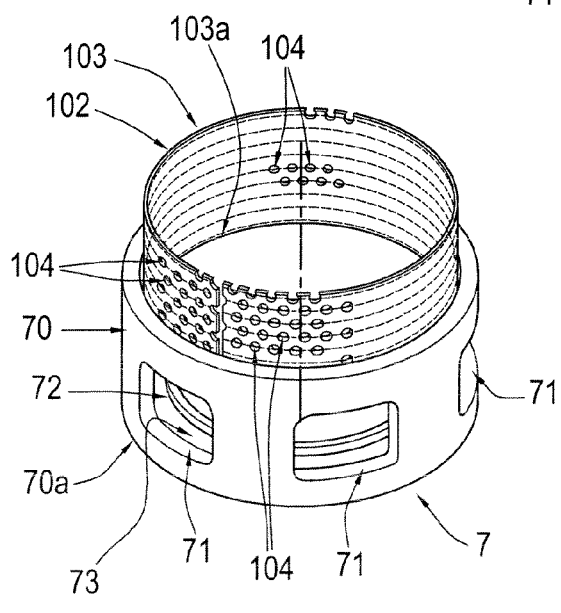
FIG. 3 is a perspective view from above of the two parts of FIG. 2 before being assembled.
Figure 4:
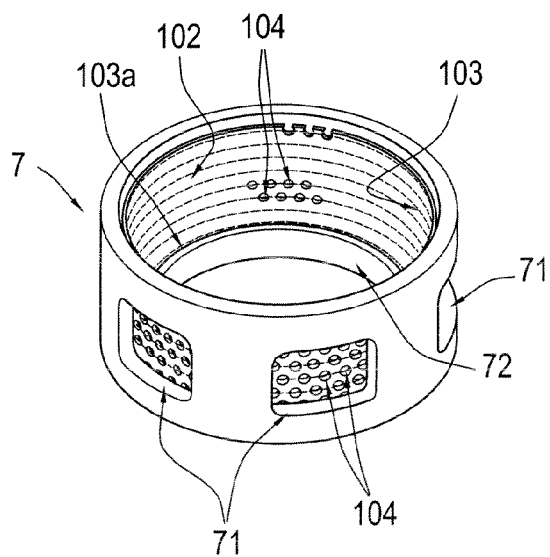
FIG. 4 is a perspective view from above of the two parts of FIG. 2 after being assembled.

As clearly shown in FIGS. 2 to 4, the silencing element 102 comprises a substantially cylindrical wall 103 with a plurality of holes 104 made in it to form the openings through which the gas passes. For simplicity, only some of the holes 104 are shown in the accompanying drawings.

Figure 6:
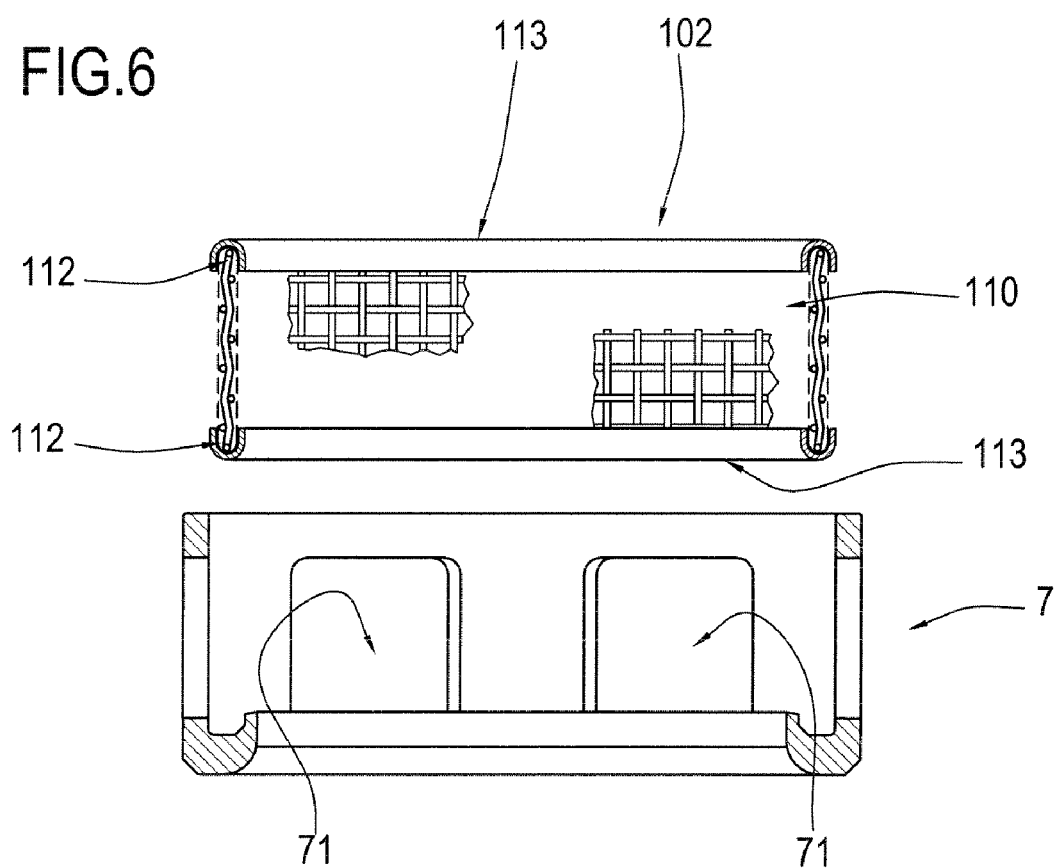
FIG. 6 is a schematic side elevation section view of another embodiment of the parts shown in FIG. 2.
Figure 7:
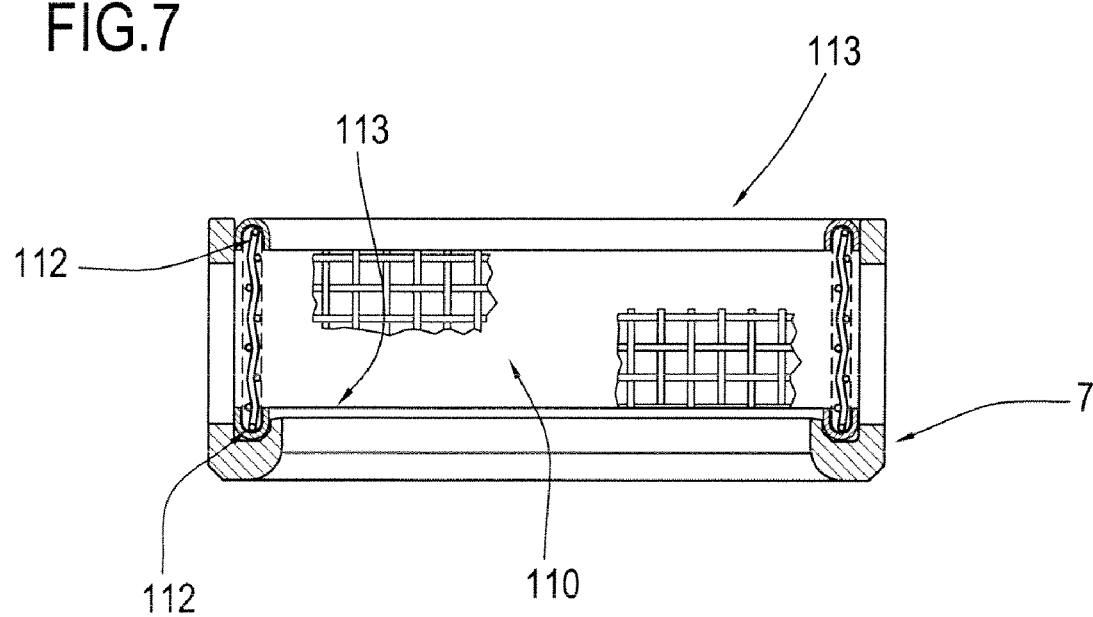
FIG. 7 is a schematic section view of the two parts of FIG. 6 after being assembled.

In another embodiment, illustrated in FIGS. 6 and 7, the silencing element 102 comprises a cylindrical wall 110 made from wire mesh.

The cylindrical wall 110 comprises two opposite circumferential edges 112 where respective stiffening rings 113 are fitted to enable the axially symmetric body 7 to be mounted.

With reference to FIG. 2, which illustrates the element 102 and the body 7 removed from the regulator 1, the axially symmetric body 7 comprises a cylindrical peripheral wall 70 with a plurality of windows 71, which are approximately quadrangular in shape and equally spaced around the circumference of the wall 70 itself.

Each of the windows 71 forms a respective port through which the gas passes from the first pipe 4 to the second pipe 6 of the regulator 1.

As stated above, FIG. 2 clearly illustrates the silencing element 102 removed from the axially symmetric body 7; the element 102 is made, preferably but not necessarily, from sheet metal with the holes 104 made in it.

The effect of the holes 104 is to divide the gas flow passing between the first pipe 4 and the second pipe 6 into a plurality of smaller flows, at least for a short distance in the proximity of the gas pressure regulation area. As a result of this division, based on substantially known fluid dynamic events which will not be described since they fall outside the scope of the invention, the amount of noise generated is considerably reduced. This reduction has been demonstrated experimentally.

The axially symmetric body 7 also comprises an annular portion 72 starting at a bottom area 70a of the cylindrical wall 70 and extending towards the inside of the body 7 itself.

As illustrated in FIGS. 1 and 2, the annular portion 72 forms the above mentioned locating groove 101 of the shutter 9.

The annular portion 72 of the body 7 further comprises a cavity 73, also annular.

As clearly illustrated in the accompanying drawings and described in more detail below, the silencing element 102 is removably housed in the axially symmetric body 7.

Looking in more detail, with reference to FIGS. 2 to 4, the above mentioned annular cavity 73 formed in the portion 72 accommodates, in the assembled configuration, a bottom edge 103a of the cylindrical wall 103 of the silencing element 102.

As illustrated in FIG. 2 the silencing element 102 has a break in its circumference, that is to say, a gap in the cylindrical wall 103, said break being designed to enable element 102 to be elastically deformed. FIG. 3 shows how the elastic deformation reduces the circumferential dimension of the silencing element 102.

The circumferential break is preferably, but not necessarily, made in the sheet metal element 102.

If the silencing element 102 comprises a wall 110 made from wire mesh, it does not have the circumferential break in it.

In other possible embodiments of the silencing element 102 that are not illustrated, the cylindrical wall 103 is made of plastic or ceramic material instead of metal.

In other words, the lateral surface of the cylindrical wall 103 that defines the silencing element 102 is not continuous and therefore has two facing end edges 103b, 103c which are spaced apart when removed from the axially symmetric body 7.

The elasticity of the material the wall 103 is made of enables the two spaced edges 103b, 103c to be moved closer together with a minimal effort by elastically deforming the cylindrical wall 103 itself. Moving the edges 103b, 103c closer together reduces the overall circumferential dimension of the silencing element 102 so that it can be inserted into the axially symmetric body 7, as clearly illustrated in FIGS. 3 and 4.

Once inside the axially symmetric body 7 in an elastically deformed configuration, the silencing element 102 exerts a corresponding elastic force in a substantially radial direction against an inside face 70b of the cylindrical wall 70 of the axially symmetric body 7.

As shown in FIG. 1, the axially symmetric body 7 is positioned between the liner 13 and a portion of the main body 2 in such a way that the gas flowing from the inlet pipe 4 to the calibrated passage 8 is forced to follow a well-defined path.

The above mentioned elastic force holds the silencing element 102 and the axially symmetric body 7 firmly together, preventing them from sliding relative to each other even if the gas flows through the regulator 1 under high pressure.

If the silencing element 102 comprises a wall 110 made from wire mesh, it is advantageously inserted into the axially symmetric body 7 in such a way that the stiffening rings 113 are pressed against the inside face 70b of the body 7 thus firmly holding the body 7 in place during operation but allowing it to be easily removed for maintenance purposes and/or to change it.

FIGS. 1 and 5 show how the axially symmetric body 7 is positioned in a stepped circumferential housing 202 formed in the main body of 2 of the regulator 1 and, when the regulator 1 is assembled, is held in place by the liner 13. At the lower end 13b of the liner 13, there is a respective step 203 designed to engage with the upper edge 70c of the axially symmetric body 7.

As illustrated in FIG. 5, the axially symmetric body 7 and/or the silencing element 102 can be fitted to, and/or extracted from, the pressure regulator 1 by simply removing certain parts of the regulator 1 itself without, for example, having to removing the bottom cover 16.

Also, thanks to the axially symmetric body 7, different types of silencers, such as, for example, perforated metal sheet or wire mesh, can be used interchangeably, and can be easily removed and fitted.

What is claimed is:

1. A gas pressure regulator comprising:
   a main body having a first, gas inlet pipe and a second, gas outlet pipe;
   a calibrated gas passage through which the gas flows from the first pipe to the second pipe;
   a shutter housed at least partially in the main body and mobile to adjust the opening of calibrated passage between an end position in which the passage is fully open and an end position in which the passage is closed; the shutter, when at the closed end position, engaging with a locating groove;
   a silencing element located at the calibrated passage to reduce the noise produced inside the pressure regulator, the silencing element comprising a substantially cylindrical wall having a plurality of openings through which the gas passes; and
   at the gas passage, an axially symmetric body for housing the silencing element, the axially symmetric body comprising a peripheral wall with a plurality of windows through which the gas passes, and the locating groove being integral with the axially symmetric body.

2. The pressure regulator according to claim 1, wherein the axially symmetric body comprises an annular portion extending from the peripheral wall towards the inside of the body itself, the annular portion forming the locating groove.

3. The pressure regulator according to claim 2, wherein the annular portion comprises an annular cavity which accommodates the lower edge of the cylindrical wall of the silencing element.

4. The pressure regulator according to claim 1, wherein the silencing element is removably housed in the peripheral wall of the axially symmetric body.

5. The regulator according to claim 4, wherein the silencing element has a break in its circumference designed to enable the silencing element to be elastically deformed so as to reduce its circumferential dimension.

6. The regulator according to claim 5, wherein the silencing element, when elastically deformed, is inserted into the peripheral wall of the axially symmetric body.

7. The pressure regulator according to claim 6, wherein the silencing element exerts an elastic force in a substantially radial direction against the peripheral wall of the axially symmetric body.

8. The regulator according to claim 1, wherein the silencing element is made from sheet metal and the openings for the passage of the gas are circular holes.

9. The regulator according to claim 1, wherein the silencing element is made from rigid wire mesh.

10. The regulator according to claim 1, wherein the silencing element is made of ceramic material.

11. The regulator according to claim 1, wherein the silencing element is made of plastic.

12. The regulator according to claim 1, where the shutter is slidably housed in a cylindrical liner stably fixed to the main body, wherein the axially symmetric body is positioned between the liner and a portion of the main body in such a way that the gas flowing from the calibrated passage is forced to follow a well-defined path.

* * * * *

UNITED STATES PATENT AND TRADEMARK OFFICE
CERTIFICATE OF CORRECTION

| | | |
|---|---|---|
| PATENT NO. | : 7,789,105 B2 | Page 1 of 1 |
| APPLICATION NO. | : 11/753274 | |
| DATED | : September 7, 2010 | |
| INVENTOR(S) | : Stefano Zecchi et al. | |

It is certified that error appears in the above-identified patent and that said Letters Patent is hereby corrected as shown below:

<u>On the Title Page</u>

At Item (30), "Mar. 10, 2007" should be -- May 24, 2006 --.

Signed and Sealed this
Fifteenth Day of March, 2011

David J. Kappos
*Director of the United States Patent and Trademark Office*